US010648301B2

(12) United States Patent
Landi et al.

(10) Patent No.: US 10,648,301 B2
(45) Date of Patent: May 12, 2020

(54) METHOD AND SYSTEM FOR PRESSURE REGULATION OF WELL FLUID FROM A HYDROCARBON WELL

(71) Applicant: VETCO GRAY SCANDINAVIA AS, Sandvika (NO)

(72) Inventors: Giacomo Landi, Sandvika (NO); Ashish Jain, Sandvika (NO); Marius Rosvold, Sandvika (NO)

(73) Assignee: Vetco Gray Scandinavia AS (NO)

( * ) Notice: Subject to any disclaimer, the term of this patent is extended or adjusted under 35 U.S.C. 154(b) by 198 days.

(21) Appl. No.: 15/525,697

(22) PCT Filed: Oct. 30, 2015

(86) PCT No.: PCT/EP2015/075337
§ 371 (c)(1),
(2) Date: May 10, 2017

(87) PCT Pub. No.: WO2016/074956
PCT Pub. Date: May 19, 2016

(65) Prior Publication Data
US 2018/0298737 A1    Oct. 18, 2018

(30) Foreign Application Priority Data
Nov. 10, 2014    (NO) .................................. 20141340

(51) Int. Cl.
*E21B 43/12* (2006.01)
*F04B 47/02* (2006.01)
(Continued)

(52) U.S. Cl.
CPC .......... *E21B 43/12* (2013.01); *E21B 41/0085* (2013.01); *F03B 17/061* (2013.01);
(Continued)

(58) Field of Classification Search
CPC .. E21B 43/126; E21B 47/065; E21B 41/0085; E21B 47/06; E21B 43/12;
(Continued)

(56) References Cited

U.S. PATENT DOCUMENTS 8,251,614 B2 * 8/2012 Karstad ................... B63G 8/08
405/190
2002/0030364 A1    3/2002 Bosley et al.
(Continued)

FOREIGN PATENT DOCUMENTS

EP    2 236 739 A2    10/2010
WO    2005/040545 A2    5/2005
(Continued)

OTHER PUBLICATIONS

Hua, G., et al., "Comparison of Multiphase Pumping Technologies for Subsea and Downhole Applications," Oil and Gas Facilities, vol. 1, No. 1, pp. 36-46 (Feb. 2012).
(Continued)

Primary Examiner — Michael R Wills, III
(74) Attorney, Agent, or Firm — Baker Hughes Patent Organization

(57) ABSTRACT

A method and a system for pressure regulation of well fluid produced from a hydrocarbon well in a hydrocarbon production field. The system comprises a pump arranged on a well head in fluid communication with a process fluid passage from the well, the pump arranged for receiving well fluid produced from the well and to deliver the fluid to downstream piping or equipment. The pump comprises a motor/generator unit operable as a generator as the pump is driven by well fluid in power generation mode, and wherein the pump is driven in power consumption mode by operation of the motor/generator unit as a motor.

19 Claims, 5 Drawing Sheets

(51) Int. Cl.
  *F04D 13/10* (2006.01)
  *E21B 41/00* (2006.01)
  *F03B 17/06* (2006.01)
  *E21B 47/06* (2012.01)

(52) U.S. Cl.
  CPC .............. *F04B 47/02* (2013.01); *F04D 13/10* (2013.01); *E21B 47/06* (2013.01); *E21B 47/065* (2013.01); *Y02E 10/28* (2013.01); *Y02P 70/527* (2015.11)

(58) Field of Classification Search
  CPC .......... F04D 13/086; F04D 13/10; F04D 3/00; F03B 17/061; Y02P 70/527; F04B 47/02; Y02E 10/28; F01D 15/00; F01D 15/08; F01D 15/10
  USPC .............................................. 290/4 R, 52, 54
  See application file for complete search history.

(56) References Cited

U.S. PATENT DOCUMENTS

| | | | | |
|---|---|---|---|---|
| 2006/0175062 | A1* | 8/2006 | Benson | E21B 17/01 166/335 |
| 2009/0079199 | A1* | 3/2009 | Tubel | E21B 41/0085 290/1 A |
| 2009/0126938 | A1 | 5/2009 | White | |
| 2013/0127390 | A1 | 5/2013 | DaCunha et al. | |
| 2013/0175958 | A1 | 7/2013 | McJunkin et al. | |
| 2015/0114632 | A1* | 4/2015 | Romer | E21B 4/003 166/250.15 |

FOREIGN PATENT DOCUMENTS

| | | |
|---|---|---|
| WO | 2005/047646 A1 | 5/2005 |
| WO | 2012/154839 A2 | 11/2012 |

OTHER PUBLICATIONS

Office Action and search report issued in connection with corresponding No Application No. 20141340 dated Jun. 10, 2015.

International Search Report and Written Opinion issued in connection with corresponding PCT Application No. PCT/EP2015/075337 dated Mar. 11, 2016.

International Preliminary Report on Patentability issued in connection with corresponding PCT Application No. PCT/EP2015/075337 dated May 16, 2017.

* cited by examiner

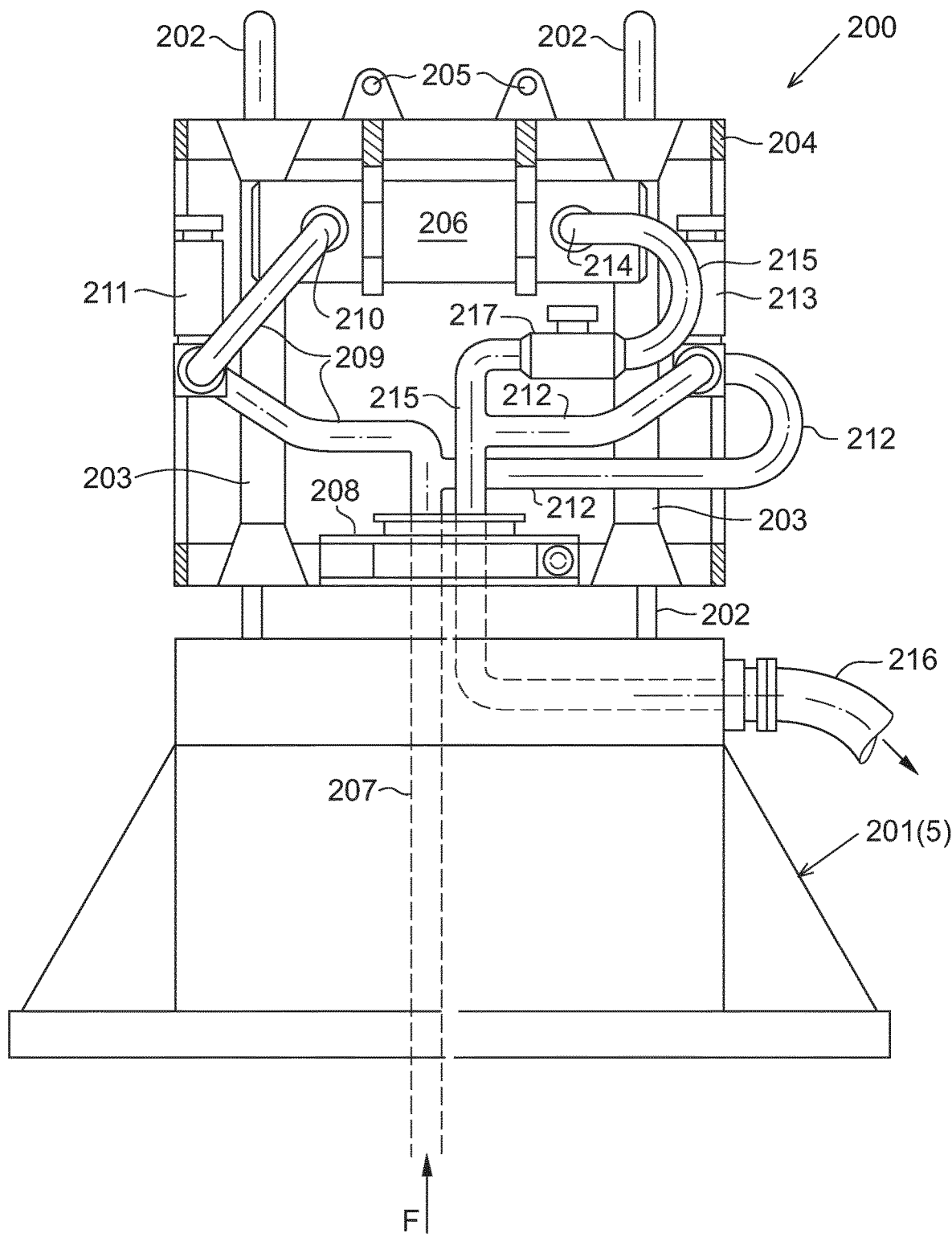

METHOD AND SYSTEM FOR PRESSURE REGULATION OF WELL FLUID FROM A HYDROCARBON WELL

BACKGROUND

The present invention relates to a method and a system arranged for regulation of pressure in well fluid from a well in hydrocarbon production. The invention particularly relates to a system aiming for reduced power consumption and recovery of energy in rotating equipment used for regulation of well fluid pressure in the production and transportation of hydrocarbon fluid from hydrocarbon wells to topside recipient.

Hydrocarbon wells in a hydrocarbon production field typically produce at different pressure and flow rate at a given point in time. The individual oil or gas well also usually delivers at a flow rate and pressure that is decreasing over time. Changes in well fluid pressure and control of flow rate and pressure in produced well fluid is conventionally handled by choking or boosting the flow: i.e. if well fluid pressure is higher than desired in downstream equipment the flow is restricted by means of a choke valve arranged on the well head, and if well fluid pressure is lower than required for transport or downstream treatment the flow may be increased by means of a booster pump or compressor arranged downstream of the choke valve. Boosting and choking are processes that either consume energy or reduce the potential production rate from wells in a subsea hydrocarbon production field.

BRIEF DESCRIPTION OF THE INVENTION

An embodiment of the present invention provides pressure regulation of well fluid produced from a well in a hydrocarbon production field.

Another an embodiment of the present invention provides a power saving method and system arranged for pressure regulation of well fluid from a well in a hydrocarbon production field.

In still another an embodiment of the present invention provides a method and a system arranged for pressure regulation and for optimization of production from wells in a hydrocarbon production field.

Another embodiment of the present invention provides a method and a system arranged for pressure regulation and for balancing of discharge pressures between wells in a hydrocarbon production field.

An embodiment provides a system arranged for pressure regulation of well fluid produced from a well in a hydrocarbon production field, the system comprising: a pump arranged on a well head in fluid communication with a process fluid passage from the well, the pump arranged for receiving well fluid produced from the well and to deliver the fluid to downstream piping or equipment, the pump comprising a motor/generator unit operable as a generator as the pump is driven by well fluid in power generation mode, and wherein the pump is driven in power consumption mode by operation of the motor/generator unit as a motor.

In embodiments of the invention, the pump is electrically connected to a power distribution unit configured to distribute recovered power to other power consumers in the system.

The pump can be realized as a helicon axial pump adapted for pressure boosting of multiphase fluid.

The pump is configured with a motor- and generator unit which has a motor that is integrated in a power and flow module.

The power and flow module is an electrically powered flow machine wherein permanent magnets are carried in the periphery of a rotor, whereas electromagnets and stator coils are supported on a casing that surrounds the rotor.

The rotor of the power and flow module comprises rotor vanes which are provided a pitch angle against the flow direction which is applied to generate a mainly axial flow through the power and flow module.

The pump of the pressure regulation system may comprise a set of integrated power and flow modules arranged in succession, wherein each power and flow module may be individually controlled via a dedicated variable speed drive (VSD).

The set of power and flow modules in a pump may comprise contra rotating rotors such that each clockwise rotating rotor follows upon an anti-clockwise rotating rotor.

In a set of power and flow modules each module may be arranged to follow directly upon a preceding module without inter-positioned stator vanes between the rotor vanes of successive power and flow modules.

When the motor/generator unit is operated as a motor, the rotor is brought in rotation as the permanent magnets move in the magnetic field which is generated when current is fed to the stator coils for energizing the electromagnets. In the motor mode the pump transfers energy to the fluid via the rotor vanes, raising the pressure in the well fluid.

When the motor/generator unit is operated as a generator the rotor is brought in rotation by the well fluid, the rotor magnets inducing current in the stator coils. In the generator mode, briefly speaking, the pump absorbs energy from the fluid via the rotor vanes, reducing the pressure in the well fluid.

The rotor vanes may be specifically designed, such as curved forward or backward relative to the rotational direction of the rotor, for transfer of energy to the well fluid or for absorbing energy from the well fluid.

In a pump comprising a set of stackable power and flow modules the modules may be alternatingly specified for the motor operation mode or the generator operation mode respectively. In other words, the pump can be equipped with power and flow modules which are alternatingly specified for transfer of energy to the well fluid or for absorbing energy from the well fluid by corresponding shaping of the rotor vanes.

The pressure regulation system of an embodiment of the present invention further comprises a central power distribution unit (SPDU) to which electrical power and control is supplied from a topside platform at sea or land. The SPDU supplies power to the pumps of the system as required and well fluid pressures are monitored and reported to the SPDU from pressure transmitters arranged on each well. The SPDU contains control logic designed to determine if the subject pump is to be operated as pressure raiser or as pressure reducer, i.e. in power consumption mode or in power generation mode.

The SPDU is further equipped to receive electrical power from a pump operating in generator mode. Electrical power received in the SPDU can be shifted between pumps in the pressure regulation system, or be delivered to other equipment in the field, or can be supplied to topside platform. In this way, the energy that is tied into the well fluid pressures can be balanced between the wells that are connected to the pressure regulation system, while simultaneously the energy consumption for pressure regulation can be reduced.

In embodiments, current well fluid pressures are monitored and reported to the SPDU from pressure transmitters arranged on wellheads.

The pressure control system of an embodiment of the present invention provides for pumps which are arranged on wellheads and operable for equalization of pressures in well fluid recovered from hydrocarbon wells that are producing at different well fluid pressures.

In one embodiment, the pressure control system comprises a pump which is arranged on a pressure regulation module that is connectible to a well head or Christmas tree/surface tree and separately retrievable therefrom.

The pump may be installed in a flow circuit comprising an inlet pipe, a discharge pipe and a by-pass pipe. The flow circuit may be connectable to the well head or Christmas tree/surface tree via a clamp connector.

Embodiments of the pressure control system foresee that a check valve is not included in the flow circuit.

Other embodiments of the present pressure control system foresee that a flowmeter is not included in the flow circuit.

More precisely, one aspect is drawn to embodiments wherein pressure sensors (PT) and temperature sensors (TT) are installed on a pressure regulation module to collect pump and fluid data required to operate the pump as virtual flowmeter.

This aspect can be realized in a method for regulation of well fluid pressure in well fluid produced from a well in a subsea hydrocarbon production field, the method comprising: arranging a pump on a well head in fluid communication with a well fluid passage from the well, wherein the pump comprises a motor/generator unit, increasing pressure in well fluid by operating the pump as motor in power consumption mode, and reducing pressure in well fluid by operating the pump as generator in power generation mode, wherein pump data and fluid data are used in calculation of flow through the pump.

Calculation of flow can be based on available pump and fluid data comprising some or all of the following data recorded during pressure regulation: fluid pressure at inlet and/or outlet of the pump, fluid temperature at inlet and/or outlet of the pump, VSD frequency, VSD voltage, VSD current, VSD power factor, motor speed (rpm, calculated from VSD data), motor power consumption (calculated from VSD data).

Operating the pump as virtual flowmeter according to embodiments of the present invention comprises implementation of i) pump curves: a function of flow rate and pump efficiency based on differential pressure, motor speed (rpm), GVF (gas volume fraction) and viscosity; and ii) fluid characterization: such as tables exported from simulators.

BRIEF DESCRIPTION OF THE DRAWINGS

Embodiments of the invention will be further explained below with reference made to the accompanying schematic drawings. In the drawings:

FIG. 4 shows an embodiment of the form of a pressure regulation module installable on a well head;

DETAILED DESCRIPTION

Figure 1:
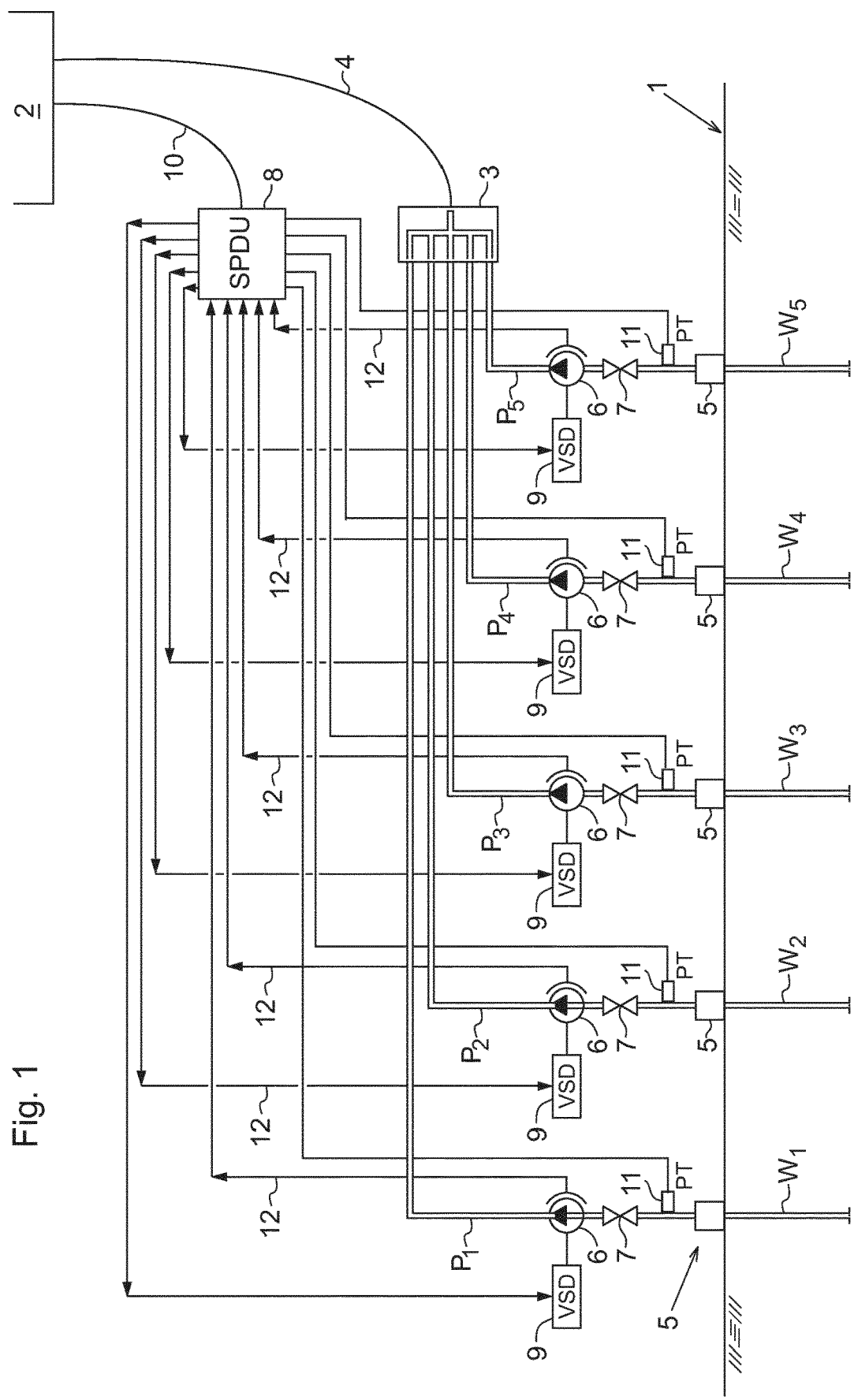
FIG. 1 shows a general layout of a subsea hydrocarbon production field in accordance with an embodiment of the present invention.

Although explained and illustrated below with reference to a subsea implementation it should be pointed out that the teachings provided herein are likewise applicable in the process of hydrocarbon production from land based hydrocarbon wells.

The general layout of a system for regulation of pressure in well fluid recovered from seafloor wells in a subsea hydrocarbon production field shall now be explained with reference to FIG. 1. A number of seafloor wells $W_1$-$W_5$, distributed over the seafloor 1, are connected to deliver well fluid to a topside platform 2 or vessel at sea or to land via pipelines $P_1$-$P_5$, a manifold 3 and a riser 4. A wellhead 5 on top of each well $W_1$-$W_5$ is arranged to carry the valves, connections and sensors which are required to produce fluid from the well.

According to FIG. 1, a pump and generator 6 is installed in the flow downstream of a choke or production valve 7. The pump/generator may however alternatively be installed upstream of the choke/production valve 7.

The pump 6 is an electrically powered flow machine wherein permanent magnets are carried in the periphery of a rotor, whereas electromagnets and stator coils are supported on a casing that surrounds the rotor, as will be further explained below.

Electrical power is supplied to the pump 6 from a subsea power distribution unit (SPDU) 8 via a variable speed drive (VSD) 9. Power and communication between the SPDU 8 and the platform 2 is transferred via an umbilical 10.

Electrical equipment that is conventionally applied to run subsea units in a hydrocarbon production field, such as transformers, rectifiers, converters etc., which are not required for the understanding of the present invention, are omitted from FIG. 1 for reason of clarity.

The SPDU 8 comprises control logic designed to process information on the current pressures in the well fluid delivered by the seafloor wells $W_1$-$W_5$. Well fluid pressures are monitored and reported to the SPDU 8 from pressure transmitters (PT) 11 located upstream of the production valves 7. The SPDU 8 uses the well fluid pressure to determine for each well whether the pump 6 is to be operated for raising the pressure, i.e. as motor in power consumption mode, or for reducing the pressure, i.e. as generator in power generation mode.

Example

If well $W_1$ produces at a pressure of 250 bar, the pump 6 may be operated in generator mode to reduce the pressure in fluid delivered from the pump down to 150 bar, e.g. Note that the pressure difference represents energy which would normally be wasted if the pressure is reduced by choking the flow.

If well $W_2$ simultaneously produces at a pressure of 100 bar the pump 6 is operated in motor mode to raise the pressure in fluid delivered from the pump to 150 bar.

The energy which is recovered by reducing the pressure 100 bar in well fluid from well $W_1$ in this example can be in the order of 500 kW, whereas the energy required to raise the pressure 100 bar in well fluid recovered from well $W_2$ can be in the same order of 500 kW. Balancing the pressures between the two wells as illustrated above can thus be accomplished with a considerable saving of energy.

The energy that is recovered from the pump 6 operating in generator mode is transferred to the SPDU 8 via electric power lines 12. The control logic installed in the SPDU 8 determines whether the recovered energy shall be routed to other pumps in the pressure control system, to other subsea power consumers or to the topside platform at sea or to at land.

The structure of the pump and generator unit 6 will now be closer explained with reference to FIG. 2.

More precisely, the pump and generator unit 6 is an electrically powered machine which can be realized in different embodiments. Common to all embodiments is an integrated permanent magnet (PM) motor wherein permanent magnets are carried in the periphery of a motor rotor and impeller, whereas electromagnets and stator coils are supported on a stationary casing that surrounds the rotor/impeller.

Embodiments of the pump 6 comprises a power and flow module wherein the rotor is formed with radial blades or rotor vanes which attach to a central rotor shaft that is journalled for rotation. Other embodiments comprise a rotor with vanes that are journalled for rotation on the exterior of a stationary shaft.

Figure 2:
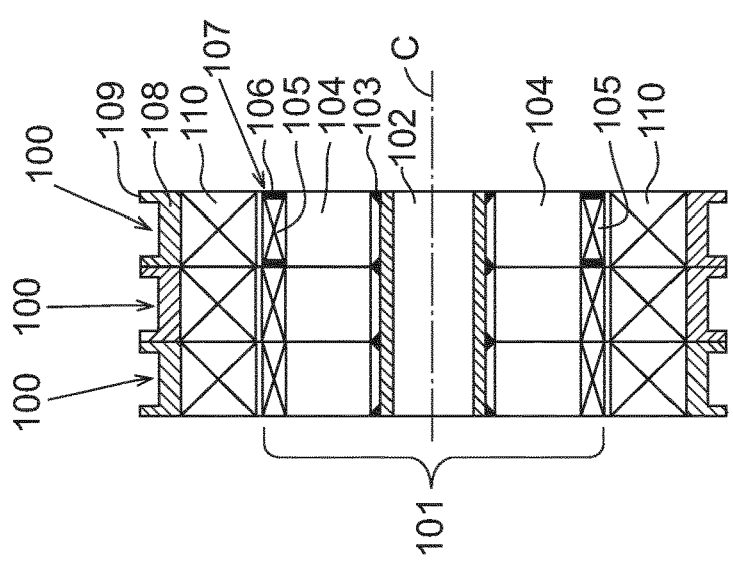
FIG. 2 is a longitudinal sectional view through power and flow modules adapted for incorporation in a pump for the pressure regulation system in accordance with an embodiment of the present invention.

With reference to FIG. 2 a set of power and flow modules 100 is shown in longitudinal sectional view. Each power and flow module 100 comprises a rotor 101 which is journalled for rotation on a rotor shaft 102. The rotor 101 can be journalled in radial/axial bearings 103 onto the exterior of a stationary rotor shaft for rotation thereabout separately from the other rotors in a set of power and flow modules. These bearings 103 can be of a kind which gets lubrication from the process fluid.

The rotors may alternatively be non-rotationally attached to a common rotor shaft which is journalled to rotate in bearings arranged on a bearing support (not shown).

Each rotor 101 comprises a set of rotor vanes 104 that extend mainly in radial direction from a rotor centre axis C. At least some of the rotor vanes 104 carry a permanent magnet 105 in the outer, peripheral end of the rotor vane. The permanent magnets 105 can be integrated in a ring member 106 interconnected to the rotor vanes in the rotor periphery 107.

The rotor 101 is surrounded by a casing 108 which has coupling means, such as flanges 109, for coupling to adjacent power and flow modules 100. Seals, not shown in the drawings, are arranged as required in the meeting interfaces between casings of coupled power and flow modules. Supported in the casing 108 is a set of electromagnets with associated stator coils, in the drawings commonly referred to by reference no. 110. The electromagnets 110 form an outer ring about the inner ring of permanent magnets, and the casing 108 can take the shape of a cylinder.

The rotor 101 is thus brought in rotation as the permanent magnets move in the magnetic field which is generated when current is fed to the stator coils for energizing the electromagnets.

Figure 3:
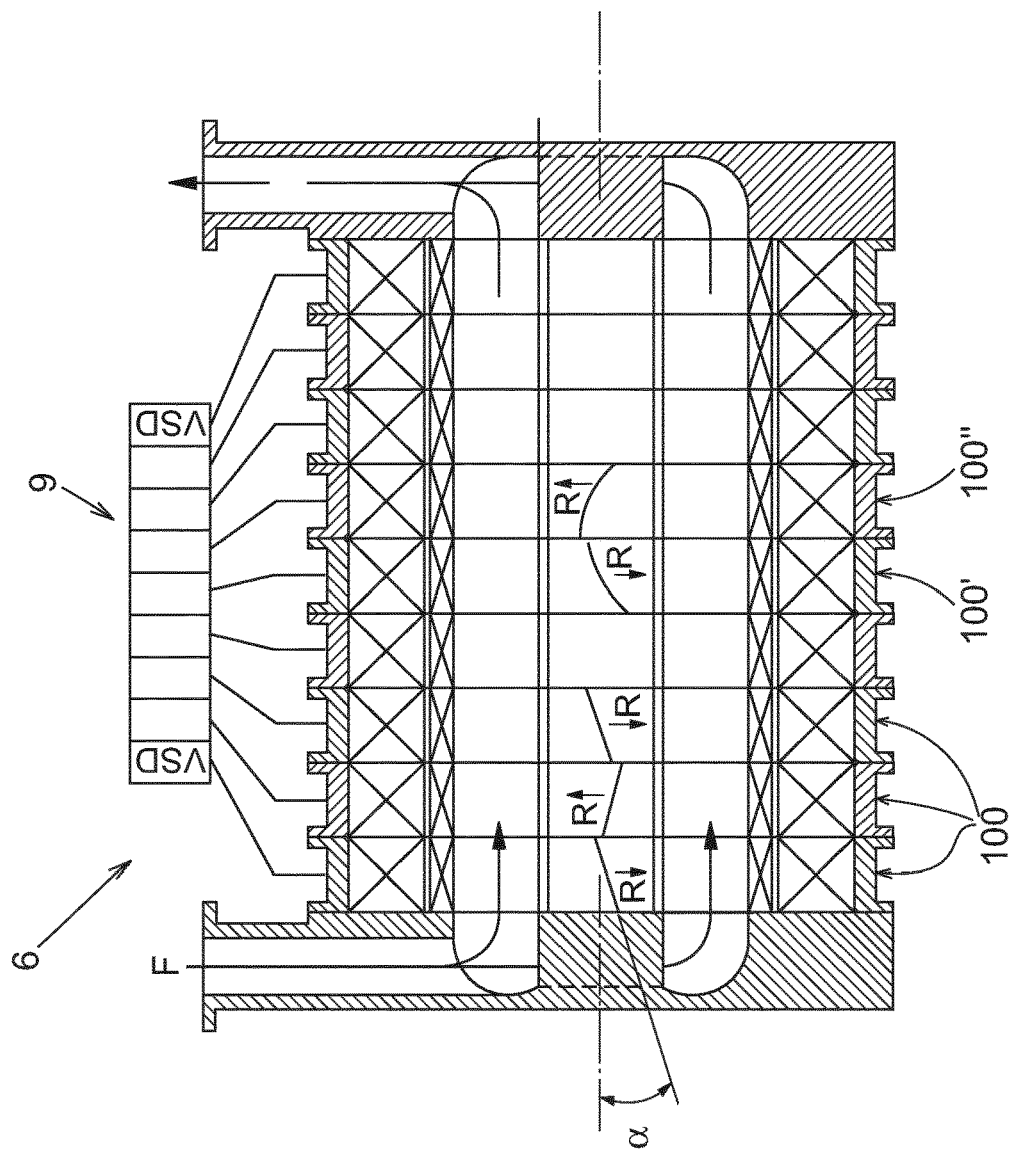
FIG. 3 is a corresponding sectional view illustrating a pump including a set of power and flow modules in accordance with an embodiment of the present invention.

In order to optimize operation each power and flow module 100 in a set of power and flow modules can be individually powered and separately controlled via dedicated variable speed drives as illustrated through the VSD boxes in FIG. 3.

If appropriate, the set of individually controlled power and flow modules can be arranged to comprise contra rotating rotors such that each clockwise rotating rotor follows upon an anti-clockwise rotating rotor as illustrated by arrows R which indicate the rotational directions in FIG. 3.

The power and flow modules 100 can be arranged to follow directly upon a preceding module without interpositioned stator vanes between the rotor vanes of successive modules 100.

In rotation the power and flow module 100 generates an axial flow in the annular flow passage that is formed through the motor rotor, acting as impeller. The rotor vanes 104 are designed with an angle of attack or pitch angle α against the flow F (see FIG. 3), and thus relative to the centre axis C. In a set of power and flow modules at least one of the rotors may have vanes with other pitch angle than the other rotors in the set. The pitch angle can be changed successively from the first to the last rotor in the set.

The rotor vanes 104 can be formed with an air-foil section to improve performance in the motor and power generation modes respectively. To illustrate that, the rotor vanes may be formed convexo-concave in sectional profile, and mounted with the concave side facing the rotational direction as illustrated in the power and flow module 100'. A convexo-concave rotor vane may alternatively be mounted with the convex side facing the rotational direction as illustrated in the power and flow module 100". Thus, the motor rotor or impeller 101 can be designed to perform optimally in either boosting mode, wherein energy is transferred to the fluid via the rotor vanes, or in retarding mode wherein energy is absorbed from the fluid via the rotor vanes.

In practise the pump may have to be designed as a compromise, eventually losing some performance in one of its two modes of operation. However, due to its axial compactness resulting from a stackable design with no stationary guides inserted between the dynamic stages of the pump, the total length can still be maintained within limits even if additional motor stages are added in compensation.

In retarding mode, the power and flow module 100 operates as a dynamo inducing current in the stator coils by the rotating magnetic field which is produced by the permanent magnets, in rotation powered by the momentum of the well fluid that passes through the rotor.

A pressure regulation system is thus disclosed wherein pumps comprising the motor/generator unit can be arranged on wellheads and operated for equalization of pressures in well fluid produced from seafloor wells or produced from land based hydrocarbon wells that produce at different well fluid pressures. In this aspect the pumps can be incorporated in installation modules which are connectible to well heads and separately retrievable as will be further explained below.

With reference to FIG. 4, a pressure regulation module 200 is illustrated in mounted position on a base 201. The base 201 can be a structural part of a well head 5, or a structure associated with a well head or Christmas tree located on the seafloor or a surface tree located topside. The base 201 comprises the passages for process fluid and injection water, power, hydraulic and signal lines etc., which are required in order to produce well fluid from a hydrocarbon well.

The pressure regulation module 200 is a separately retrievable unit which is mated with the base 201 by insertion on guide posts 202 that rise from the base, and which are received in guide tubes 203 included in the pressure regulation module 200. Installations in the pressure regulation module 200 are supported in a frame work 204, providing lifting eyes 205 for lifting and lowering the pressure regulation module 200 onto the base 201.

Installed in the pressure regulation module 200 is a pump 206, comprising the power and flow module 100, 100' or 100" substantially as disclosed above. The pump 206 is included in a flow circuit that communicates with the process fluid flow and which is connected to a passage in the well head for well fluid produced from the well. In FIG. 4 the fluid passage is indicated by the broken lines 207. A sealed connection of the flow circuit with the process fluid passage is accomplished through a clamp connector 208.

The flow circuit in the pressure regulation module 200 comprises an inlet pipe 209 which feeds the process fluid to a pump inlet 210 via an isolation valve 211 in open position. In closed position the isolation valve 211 routes the process fluid in a by-pass flow via pipe 212 and a by-pass valve 213 in open position. In normal operation, i.e. when the process fluid passes the pump 206, the by-pass valve 213 is closed.

In the pump 206 the process fluid passes the stages of power and flow modules to a pump outlet 214. A discharge pipe 215 discharges the process fluid to pipeline 216 via a check valve 217 by which reverse flow is avoided.

Based on the power and flow module 100, the pump 206 can be operated for raising or reducing the pressure in the process fluid by controlling the pump between power generation and power consumption modes. In that sense the pump 206 can replace the choke valve that is traditionally used to restrict the flow and reduce pressure in well fluid.

Figure 5:
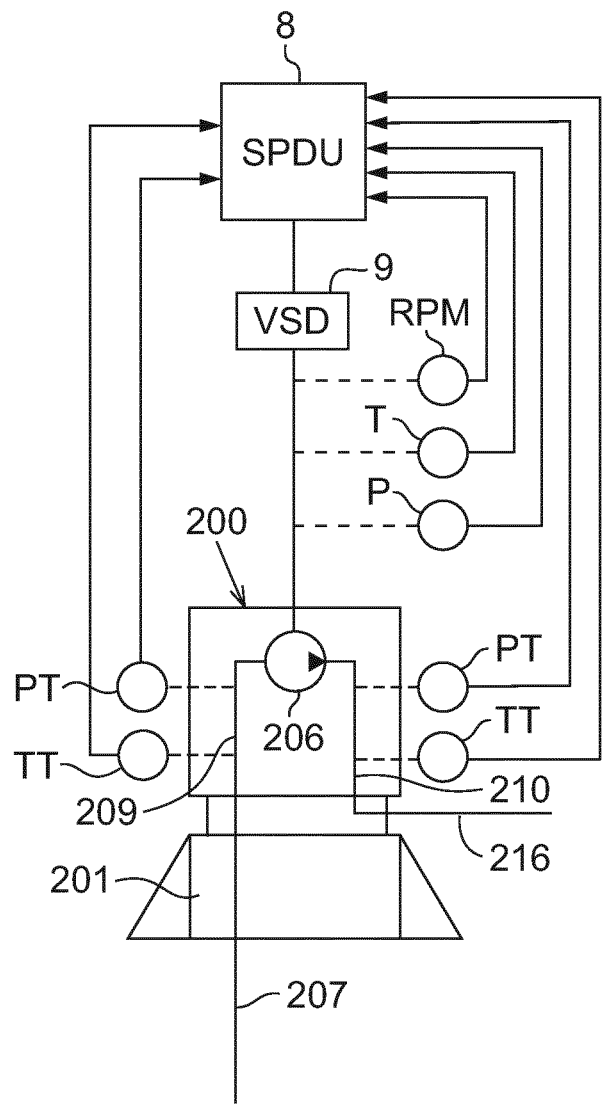
FIG. 5 illustrates schematically the signal routes between a pressure regulation module, a variable speed drive and a subsea power distribution unit in a pressure regulation system according to an embodiment.

However, pumping parameters such as variations in flow and pressure, delta pressure, pump specification and efficiency versus power consumption etc. are related and indicative of flow conditions. Pump data such as rotational speed, consumed power versus pump maps, pressure and temperature inputs etc., can be retrieved and used to access gas volume fraction and mass flow in a pressure regulation method which avoids the use of the traditionally used flowmeter. FIG. 5 illustrates schematically the signal routes between the pressure regulation module 200, the VSD 9 and the SPDU 8 in a pressure regulation. In FIG. 5, the reference symbol P represents power factor and T represents torque developed in the pump, PT represents pressure transmitters or sensors, TT represents temperature transmitters or sensors, and RPM is the motor or pump speed in revolutions per minute.

Among measured data available to support the operation of the pump 206 as a virtual flowmeter are: Fluid pressure at inlet and/or outlet of the pump; Fluid temperature at inlet and/or outlet of the pump; VSD frequency; VSD voltage; VSD current; VSD power factor; Motor speed (RPM, calculated from VSD data); Motor power consumption (calculated from VSD data).

The following information is additionally available: Pump curves: a function of flow rate and pump efficiency based on differential pressure, motor speed (rpm), GVF (gas volume fraction) and viscosity; Fluid characterization: such as tables exported from simulators, for instance.

Figure 6:
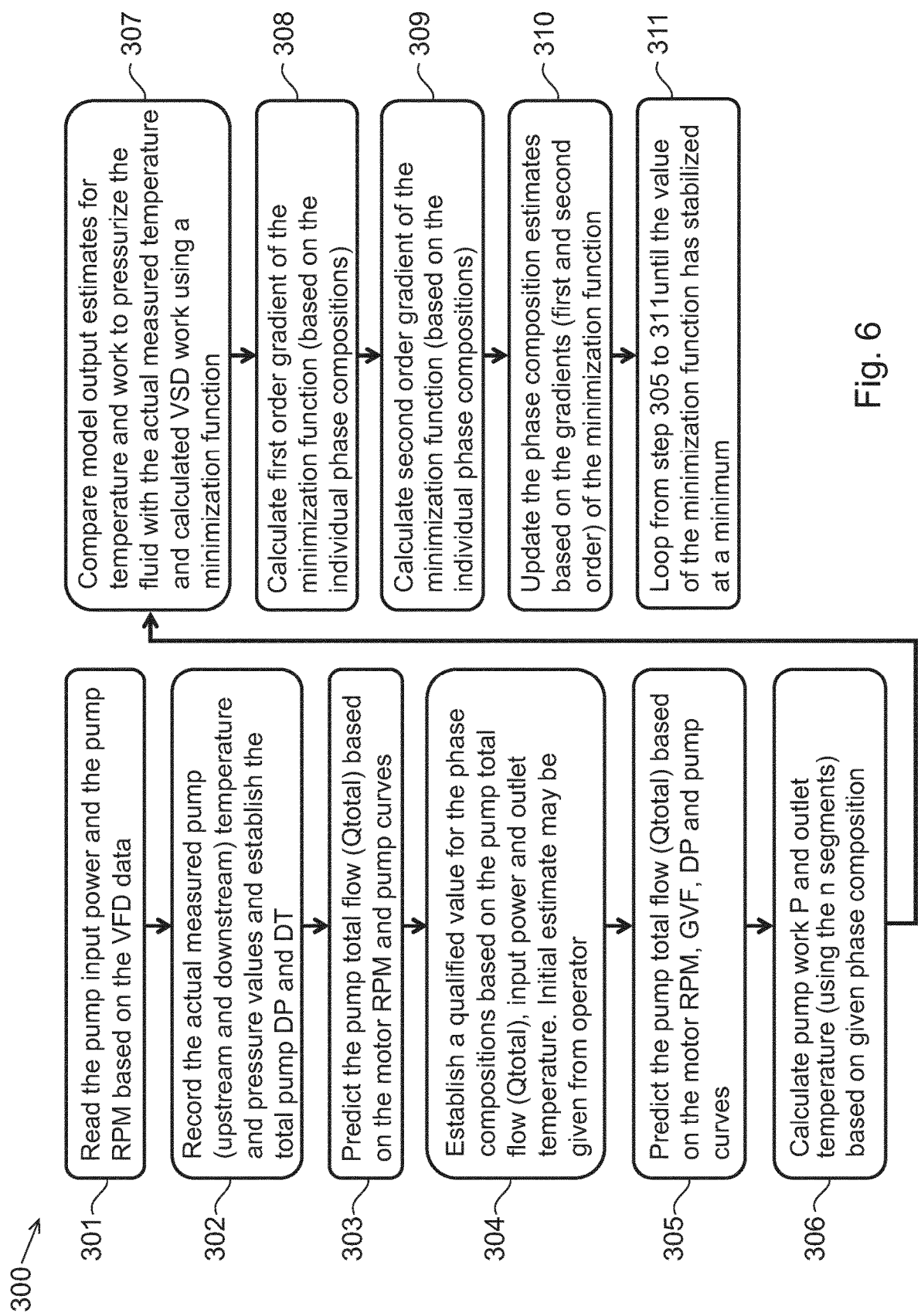
FIG. 6 is a flow diagram showing the steps of a method for operating a pump as a virtual flowmeter in accordance with an embodiment of the present invention.

The available data and measurements can be used in a method 300 for operating the pump (i.e. the pump based on the power and flow module 100) comprising the following steps, illustrated in FIG. 6:

In step 301: Read the pump input power and the pump RPM based on VSD data

In step 302: Read the actual measured pump temperature and pressure values (upstream and downstream) and establish the total pump DT (delta pressure) and DT (delta temperature)

In step 303: Predict the pump total flow ($Q_{total}$) based on the motor RPM and pump curves In step 304: Establish a qualified value for the fluid phase composition based on the pump total flow ($Q_{total}$), input power and outlet temperature (Initial estimate may be given from operator)

In step 305: Predict the pump total flow ($Q_{total}$) based on the motor RPM, GVF, DP and pump curves In step 306: Calculate pump work P and outlet temperature (using the n motor segments), based on a given phase composition In step 307: Compare model output estimates for temperature and work to pressurize the fluid with the actual measured temperature and calculated VSD work using a minimization function In step 308: Calculate first order gradient of the minimization function (based on the individual phase compositions)

In step 309: Calculate second order gradient of the minimization function (based on the individual phase compositions)

In step 310: Update the phase compositions estimates based on the gradients (first and second order) of the minimization function In step 311: Loop from step 305 to 311 until the value has stabilized at a minimum.

Calculating the pump work P in step 306 can be accomplished by solving the equation:

$$P = \dot{m}_T \sum_{i=1}^{n} W_i$$

where $W_1$ is the specific work in each pump segement and $\dot{m}_T$ is the total mass flow rate.

The pressure regulation system as disclosed thus provides for implementation of a pressure regulation method comprising: arranging a pump on a well head in fluid communication with a well fluid passage from the well, wherein the pump comprises a motor/generator unit, increasing pressure in well fluid by operating the pump as a motor in power consumption mode, and reducing pressure in well fluid by operating the pump as a generator in power generation mode, wherein pump data and fluid data are used in calculation of the actual flow through the pump.

It has thus been explained above and illustrated in drawings of exemplifying embodiments, that a highly integrated, compact and power saving system for pressure regulation of well fluid produced from a hydrocarbon well can be achieved by implementation of the teachings presented herein.

Still, it will be appreciated that modifications of the disclosed embodiments are possible without leaving the scope and spirit of the invention as disclosed above and defined in the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A system arranged for pressure regulation of well fluid recovered from a hydrocarbon well in a hydrocarbon production field, the system comprising:
a pump arranged on a well head in fluid communication with a process fluid passage from the well and configured to receive well fluid produced from the well and deliver the fluid to downstream piping or equipment, the pump comprising a motor/generator unit operable as a generator as the pump is driven by well fluid in power generation mode,
wherein the pump is driven in power consumption mode by operation of the motor/generator unit as a motor, and is electrically connected to a power distribution unit configured to distribute recovered power to other power consumers in the system.

2. A system arranged for pressure regulation of well fluid recovered from a hydrocarbon well in a hydrocarbon production field, the system comprising:
a pump arranged on a well head in fluid communication with a process fluid passage from the well and configured to receive well fluid produced from the well and deliver the fluid to downstream piping or equipment, the pump comprising a motor/generator unit operable as a generator as the pump is driven by well fluid in power generation mode,
wherein the pump is a helicon axial pump adapted for pressure boosting of multiphase fluid and is driven in power consumption mode by operation of the motor/generator unit as a motor.

3. A system arranged for pressure regulation of well fluid recovered from a hydrocarbon well in a hydrocarbon production field, the system comprising:
a pump arranged on a well head in fluid communication with a process fluid passage from the well and configured to receive well fluid produced from the well and deliver the fluid to downstream piping or equipment, the pump comprising a motor/generator unit operable as a generator as the pump is driven by well fluid in power generation mode,
wherein the motor of the motor/generator unit is integrated in a power module and flow module, and the pump is driven in power consumption mode by operation of the motor/generator unit as a motor.

4. The pressure regulation system according to claim 3, wherein the power module and flow module is an electrically powered flow machine wherein permanent magnets are carried in the periphery of a rotor, wherein electromagnets and stator coils are supported on a casing that surrounds the rotor.

5. The pressure regulation system according to claim 4, wherein the rotor of the power module and flow module comprises rotor vanes which are provided a pitch angle against the flow direction.

6. The pressure regulation system according to claim 5, wherein the pump comprises a set of integrated power modules and flow modules arranged in succession, wherein each power module and flow module is individually controlled via a dedicated variable speed drive.

7. The pressure regulation system according to of claim 6, wherein the set of power modules and flow modules in the pump comprises contra rotating rotors such that each clockwise rotating rotor follows upon an anti-clockwise rotating rotor.

8. The pressure regulation system according to claim 7, further comprising a set of the power modules and the flow modules arranged such that each module is to follow directly upon a preceding module without inter-positioned stationary guides between the rotors of successive power and flow modules.

9. The pressure regulation system of claim 4, wherein the rotor vanes are configured to transfer energy to the well fluid or to absorb energy from the well fluid respectively.

10. The pressure regulation system of claim 9, further comprising a set of stackable power modules and flow modules wherein the modules are alternatingly specified to transfer energy to the well fluid or absorb energy from the well fluid by corresponding shaping of the rotor vanes.

11. A system arranged for pressure regulation of well fluid recovered from a hydrocarbon well in a hydrocarbon production field, the system comprising:
a pump arranged on a well head in fluid communication with a process fluid passage from the well and configured to receive well fluid produced from the well and deliver the fluid to downstream piping or equipment, the pump comprising a motor/generator unit operable as a generator as the pump is driven by well fluid in power generation mode; and
a subsea power distribution unit containing control logic to determine if the pump is to be operated in power consumption mode or in power generation mode,
wherein the pump is driven in power consumption mode by operation of the motor/generator unit as a motor.

12. The pressure regulation system according to claim 11, wherein current well fluid pressures are monitored and reported to the subsea power distribution unit from pressure transmitters arranged on well heads.

13. A system arranged for pressure regulation of well fluid recovered from a hydrocarbon well in a hydrocarbon production field, the system comprising:
a pump arranged on a well head in fluid communication with a process fluid passage from the well and configured to receive well fluid produced from the well and deliver the fluid to downstream piping or equipment, the pump comprising a motor/generator unit operable as a generator as the pump is driven by well fluid in power generation mode,
wherein the pump is arranged on a well head, is operable for equalization of pressures in well fluid recovered from hydrocarbon wells producing at different well fluid pressures, and is driven in power consumption mode by operation of the motor/generator unit as a motor.

14. A system arranged for pressure regulation of well fluid recovered from a hydrocarbon well in a hydrocarbon production field, the system comprising:
- a pump in fluid communication with a process fluid passage from the well and configured to receive well fluid produced from the well and deliver the fluid to downstream piping or equipment, the pump comprising a motor/generator unit operable as a generator as the pump is driven by well fluid in power generation mode,
- wherein the pump is arranged on a pressure regulation module that is connectible to a well head or Christmas tree or surface tree and separately retrievable therefrom, and is driven in power consumption mode by operation of the motor/generator unit as a motor.

15. The pressure regulation system according to claim 14, wherein the pump is included in a flow circuit comprising an inlet pipe, a discharge pipe and a by-pass pipe.

16. The pressure regulation system according to claim 14, further comprising pressure sensors and temperature sensors installed on the pressure regulation module to collect pump and fluid data required to operate the pump as virtual flowmeter.

17. A method for regulation of well fluid pressure in well fluid produced from a hydrocarbon well in a hydrocarbon production field, the method comprising:
- arranging a pump on a well head in fluid communication with a well fluid passage from the well, wherein the pump comprises a motor/generator unit; and
- increasing pressure in well fluid by operating the pump as motor in power consumption mode, and reducing pressure in well fluid by operating the pump as generator in power generation mode;
- wherein pump data and fluid data are used in calculation of the actual flow through the pump.

18. The method of claim 17, wherein the calculation of actual flow is based on available pump and fluid data comprising at least one of the following group of data recorded during pressure regulation, the group comprising fluid pressure at inlet and/or outlet of the pump;
- fluid temperature at inlet and/or outlet of the pump;
- VSD frequency;
- VSD voltage;
- VSD current;
- VSD power factor;
- motor speed (RPM, calculated from VSD data); and
- motor power consumption (calculated from VSD data).

19. The method of claim 18, further comprising implementation of pump curves and fluid characterization.

* * * * *